(12) United States Patent
Zecevic et al.

(10) Patent No.: US 8,110,314 B2
(45) Date of Patent: Feb. 7, 2012

(54) MEANS OF STABILIZING ELECTROLYTE IN A DIRECT CARBON-AIR FUEL CELL BASED ON A MOLTEN METAL HYDROXIDE ELECTROLYTE

(75) Inventors: Strahinja Zecevic, Tustin, CA (US); Edward Patton, Torrance, CA (US); Parviz Parhami, Long Beach, CA (US)

(73) Assignee: Scientific Applications and Research Associates, Inc., Cypress, CA (US)

( * ) Notice: Subject to any disclaimer, the term of this patent is extended or adjusted under 35 U.S.C. 154(b) by 1215 days.

(21) Appl. No.: 11/156,750

(22) Filed: Jun. 20, 2005

(65) Prior Publication Data

US 2005/0282063 A1    Dec. 22, 2005

Related U.S. Application Data

(60) Provisional application No. 60/581,387, filed on Jun. 22, 2004.

(51) Int. Cl.
*H01M 8/14* (2006.01)
*H01M 4/86* (2006.01)

(52) U.S. Cl. ........ 429/472; 429/477; 429/478; 429/502; 429/505

(58) Field of Classification Search .......... 429/402–407, 429/472–478
See application file for complete search history.

(56) References Cited

U.S. PATENT DOCUMENTS

| | | | |
|---|---|---|---|
| 3,669,752 A * | 6/1972 | Novack et al. ................ | 429/472 |
| 6,200,697 B1 * | 3/2001 | Pesavento ....................... | 429/28 |
| 6,692,861 B2 * | 2/2004 | Tao ................................. | 429/44 |
| 2002/0028372 A1 * | 3/2002 | Ohlsen et al. ................... | 429/40 |
| 2002/0106549 A1 * | 8/2002 | Cooper et al. .................. | 429/40 |

* cited by examiner

*Primary Examiner* — Ula C Ruddock
*Assistant Examiner* — Amanda Barrow
(74) *Attorney, Agent, or Firm* — Stetina Brunda Garred & Brucker

(57) ABSTRACT

A system and a method for suppressing the build up of metal carbonates in the electrolyte, using a porous cell separator is used to allow the use of different electrolyte compositions around the anode (anolyte) and the cathode (catholyte). This cell configuration enables the oxygen cathode to operate in a molten hydroxide electrolyte, and the carbon anode to operate in mixed carbonate-hydroxide melt, so that most of the advantages of using a molten hydroxide electrolyte will be retained.

13 Claims, 2 Drawing Sheets

MEANS OF STABILIZING ELECTROLYTE IN A DIRECT CARBON-AIR FUEL CELL BASED ON A MOLTEN METAL HYDROXIDE ELECTROLYTE

CROSS-REFERENCE TO RELATED APPLICATIONS

This application claims priority to Provisional Patent Application Ser. No. 60/581,387, filed Jun. 22, 2004, entitled A MEANS OF STABILIZING THE ELECTROLYTE IN A DIRECT CARBON-AIR FUEL CELL BASED ON A MOLTEN METAL HYDROXIDE ELECTROLYTE, the teaching of which are expressly incorporated herein by reference.

STATEMENT RE: FEDERALLY SPONSORED RESEARCH/DEVELOPMENT

Not Applicable

BACKGROUND

The present invention relates in general to a carbon-air fuel cell, and more particularly, to a system and a method for stabilizing a molten metal hydroxide electrolyte in a direct carbon-air fuel cell.

The use of a molten metal hydroxide as an electrolyte in a direct carbon-air fuel cell has several distinct advantages over the use of a molten metal carbonate. These advantages include higher electrical conductivity, higher electrochemical activity of carbon and oxygen electrodes, lower operating temperatures (500° C. versus 750°) and consequently use of less expensive materials for cell container. Thus, an inexpensive ultra-low carbon steel material can be used to fabricate the cell container. Furthermore, when this material is doped with 1-2% titanium, a surface oxide containing a degenerative semiconductor with stable electrical conductivity and enhanced corrosion stability is formed. Moreover, this material was found to possess excellent catalytic properties for oxygen reduction. Therefore, it can be used to fabricate both cell containers and cathodes. At the lower operating temperature of the molten metal hydroxide, the dominant product of carbon oxidation is $CO_2$. This allows four electrons to be exchanged per one carbon atom. In a molten carbonate system at temperature higher than 750° C., the dominant product is CO where only two electrons are exchanged per one carbon atom. This allows the fuel cell using molten metal hydroxides to have a higher operating voltage than a fuel cell using molten metal carbonate electrolytes. Furthermore, in a molten hydroxide electrolyte the electrochemical activity of the oxygen/air cathode is exceptionally high. That is not the case with molten carbonate electrolyte. This enables a very simple cell design in which the oxygen electrode is not a complex high surface area structure as is used in traditional fuel cell designs. Thus, a solid carbon rod or plate immersed into molten metal hydroxide electrolyte can serve as the anode fuel. The carbon fuel can also be in form of chunks and other particulate type of carbon material. The molten hydroxide is contained in the cell container which can also act as the air cathode. The shape of the cell container can be either cylindrical or prismatic. The air cathode is fed with oxygen by introducing air into the molten electrolyte via a gas bubbler located at the bottom of the cell. The simple cell design of the carbon-air fuel cell with a molten hydroxide electrolyte makes the cost of this cell substantially lower than the cost of the cell with a carbonate electrolyte.

However, these advantages have, in the past come at a price, primarily due to the lack of invariance of the molten hydroxide electrolyte caused by its reaction with carbon dioxide produced at the anode resulting in the formation of carbonate salt. The carbonate salt adversely affects the cell operation and in the course of time lessens its efficiency.

A need therefore exists for a system and a method that reduces or eliminates the carbonization of a molten metal hydroxide electrolyte in a carbon-air fuel cell.

BRIEF SUMMARY

A system and a method for suppressing the build up of metal carbonates in the electrolyte are provided. A porous cell separator is used to allow the use of different electrolyte compositions around the anode (anolyte) and the cathode (catholyte). This cell configuration enables the oxygen cathode to operate in a molten hydroxide electrolyte, and the carbon anode to operate in mixed carbonate-hydroxide melt, so that most of the advantages of using a molten hydroxide electrolyte will be retained. In brief, oxygen is reduced at the cathode in a hydroxide environment producing hydroxyl ions. Hydroxyl ions thus formed are transported from the catholyte through a porous cell separator into the anolyte where they react with carbon dioxide produced at the anode, thus forming carbonate ions. The reaction between carbon dioxide and hydroxyl ions leads to an increase in carbonate salt concentration in the anolyte. When the carbonate salt concentration reaches a certain level, carbonate ions start taking part in the anodic oxidation of carbon producing gaseous carbon dioxide that escapes the molten electrolyte thus preventing further carbonate salt build up, rendering the electrolyte invariant.

The two-compartment cell design using a porous cell diaphragm separator allows the compositions of the anolyte and the catholyte to be different from each other; and consequently, the hydroxyl ions in the catholyte from being reacted with carbon dioxide, and, once the anolyte composition has come to an equilibrium the carbonization of the electrolyte at the carbon anode is effectively suppressed.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
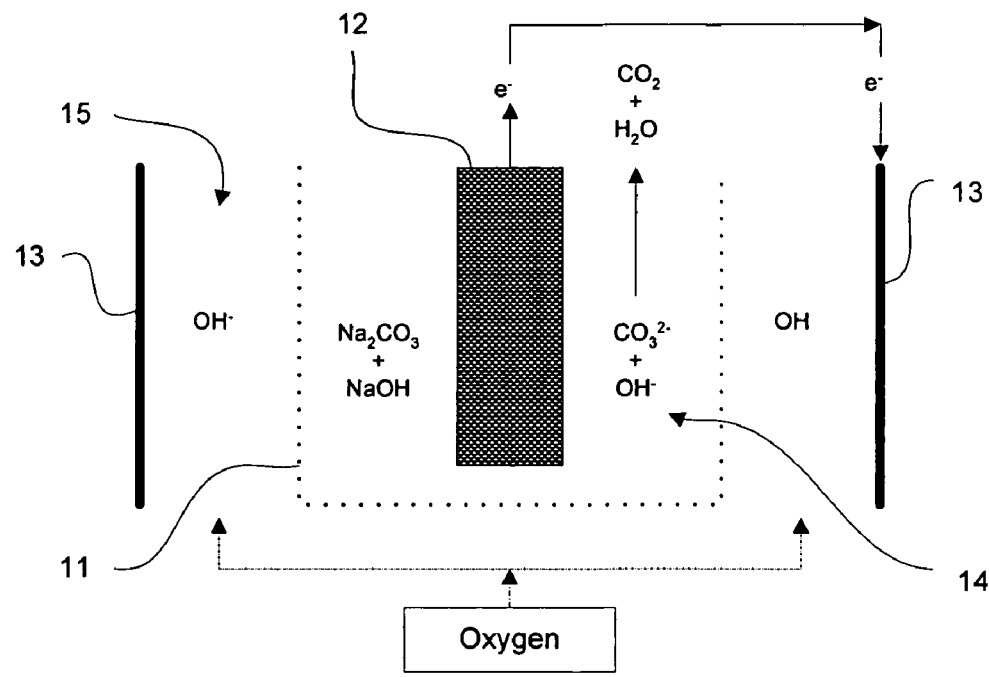
FIG. 1 shows a first embodiment of a direct carbon-air fuel cell based on a molten metal hydroxide electrolyte.

FIG. 1 illustrates a first embodiment of a direct carbon-air fuel cell based on a molten metal hydroxide electrolyte. As shown, the direct carbon-air fuel cell includes a carbon anode 12, an oxygen cathode 13, and a porous separator 11 placed between the carbon anode 12 and the oxygen cathode 13. By placing the porous separator 11 between the carbon anode 12 and the oxygen cathode 13, the cell is divided into two compartments 14 and 15, in which the electrolyte near the carbon anode 12, that is, the anolyte 14, is separated from the electrolyte near the oxygen cathode, namely, the catholyte 15. To allow a certain type of ions to transport through the separator 11, the separator 11 includes a plurality of small pores and is preferably fabricated from porous ceramic, metal, glass material or a combination thereof. The pores of the separator 11 are formed so small that the dominant means of ions transport through the separator 11 is migration under the influence of an electric field between the carbon anode 12 and the oxygen cathode 13, while other means of ion transport such as diffusion and convection are hindered by the small pore size. This enables the compositions of the anolyte in the compartment 14 and the catholyte in the compartment 15 to be different. Thus, under the influence of an electric field between the carbon anode 12 and the oxygen cathode 13, negatively charged ions such as $OH^-$ and $CO_3^{2-}$ are transported from the cathode 13 towards the carbon anode 12, and positively charged ions such as $Na^+$, $Li^+$ and $K^+$ are transported from the anolyte in the compartment 14 towards the catholyte in the compartment 15. Since the carbonate ions cannot be transported in the opposite direction, the carbonization of the catholyte does not take place in the compartment 15. This means that the cathodic reduction of oxygen takes place in a hydroxide electrolyte environment. An oxygen containing gas, either dry or humid, is introduced into the catholyte compartment 15 and its reduction at the cathode 13 takes place according to the equation:

$$O_2 + 2H_2O + 4e^- \rightarrow 4OH^- \tag{1}$$

The hydroxyl ions formed according Equation (1) migrate through the porous separator 11 into the anolyte compartment 14 leaving the composition of the catholyte unchanged. In the anolyte compartment 14, the hydroxyl ions react at the carbon anode 12 according to the equation:

$$C + 6OH^- \rightarrow CO_3^{2-} + 3H_2O + 4e^- \tag{2}$$

The concentration of carbonate ions formed according to Equation (2) increases over time and when it reaches a certain level, carbonate ions start reacting at the carbon anode 12 according to the equation:

$$C + 2CO_3^{2-} \rightarrow 3CO_2 + 4e^- \tag{3}$$

The increase in concentration of carbonate ions is stopped by the reaction according to Equation (3); and subsequently, gaseous carbon dioxide is released. Thus, anodic carbon oxidation takes place in a mixed carbonate-hydroxide electrolyte and therefore the performance of the carbon anode 12 is better than in pure carbonate melts.

The catholyte in the compartment 15 comprises metal hydroxides. A single metal hydroxide or a combination of metal hydroxides may be used, in particular, mixtures of low melting alkali and/or alkaline earth hydroxides are preferably used. Commonly used hydroxides are eutectic mixtures of LiOH, KOH, and/or NaOH.

The anolyte in the compartment 14 may also comprise metal hydroxides as the catholyte does since hydroxides will convert into carbonates up to a certain level during the course of the cell operation. Alternatively, the anolyte can initially comprise metal carbonates since hydroxyl ions are transported through the porous separator 11 to the anode compartment 14. A single metal carbonate or a combination of metal carbonates may be used at cell startup, in particular, mixtures of low melting alkali and/or alkaline earth carbonates can be preferably used. Commonly used carbonates are eutectic mixtures of $Li_2CO_3$, $Na_2CO_3$ and/or $K_2CO_3$ that should match with the mixtures of alkali and/or alkaline earth hydroxide in the catholyte.

The porous separator 11 can comprise a porous planar plate, porous tubular plate or other similar structures. The porous separator 11 is constructed to be capable of transporting hydroxyl and metal ions between the anode compartment 14 and the cathode compartment 15. The separator 11 can comprise a non-reactive metal oxide such as $ZrO_2$, $Al_2O_3$, $LiAlO_2$, MgO, mullite, kaolite, rare earth oxides or other similar materials. Corrosion resistant metals such as nickel and its alloys, stainless steels, titanium doped mild steel and similar materials can also be used to fabricate the porous separator 11.

The oxygen cathode 13 in this embodiment serves also as the cell housing/container as well as the cathode current collector. The cathode 13 can be selected from any non porous, electrically conducting material which is chemically stable in molten hydroxide electrolyte and electrochemically active for oxygen reduction, such as mild steel doped with titanium, nickel doped with titanium, stainless steel, Inconel 600, Permalloy 80, and other nickel based alloys. In order to increase the cathode surface area the cell housing/cathode 13 may have a two layer structure in which the inner layer facing the molten electrolyte is made in form of a mesh, grid, felt, screen, sintered frit or other similar structure. The cathode 13 is in contact with an oxygen-containing gas while concurrently in contact with molten hydroxide in the compartment 15. The combination of a molten hydroxide in the presence of gaseous oxygen creates a very corrosive environment and thus the cathode 13 can beneficially contain a corrosion resistant and electrically conducting metal such as nickel, stainless steel, a corrosion resistant alloy, conductive oxides, such as NiO, $LiCoO_2$, $LiFeO_2$, $Li_xNi_{1-x}O$ or other similar material. In the two layer-structure of the cathode 13 the outer layer is nonporous and is made of corrosion resistant materials such as mild steel doped with titanium, nickel doped with titanium, stainless steel, Inconel 600, Permalloy 80, and other nickel based alloys the same material as the inner layer.

An oxygen-containing gas is introduced to the cell through the bubbler element at the cell bottom. The oxygen-containing gas comprises air, but can be any inert gas that contains oxygen or even pure oxygen. The oxygen containing gas may be humidified in order to reduce the corrosion of the cell components. In the cell with a parallel plate separator 11 molten catholyte and anolyte can flow through the cell. In that case an oxygen-containing gas can be introduced into the catholyte through the bubbler element located outside the cell and then the oxygen enriched catholyte can be introduced into the cell.

The carbon anode fuel 12 can be made of various carbon-containing materials such as coal, petroleum coke, coal coke, and gas carbon, as well as biomass carbon (charcoal) adb graphite. Since the carbon anode is at the same time the anode current collector its structure should be rigid enough.

A feature of the invention is that the separator 11 is impermeable to gas bubbles and/or completely wetted by the electrolyte to avoid direct chemical reaction of the carbon fuel with oxygen from the cathode compartment 15. Furthermore, the porous separator 11 should be of sufficient thickness to assure mechanical strength. It is desirable that the porous separator 11 be thin enough to minimize resistive losses through the electrolyte.

Figure 2:
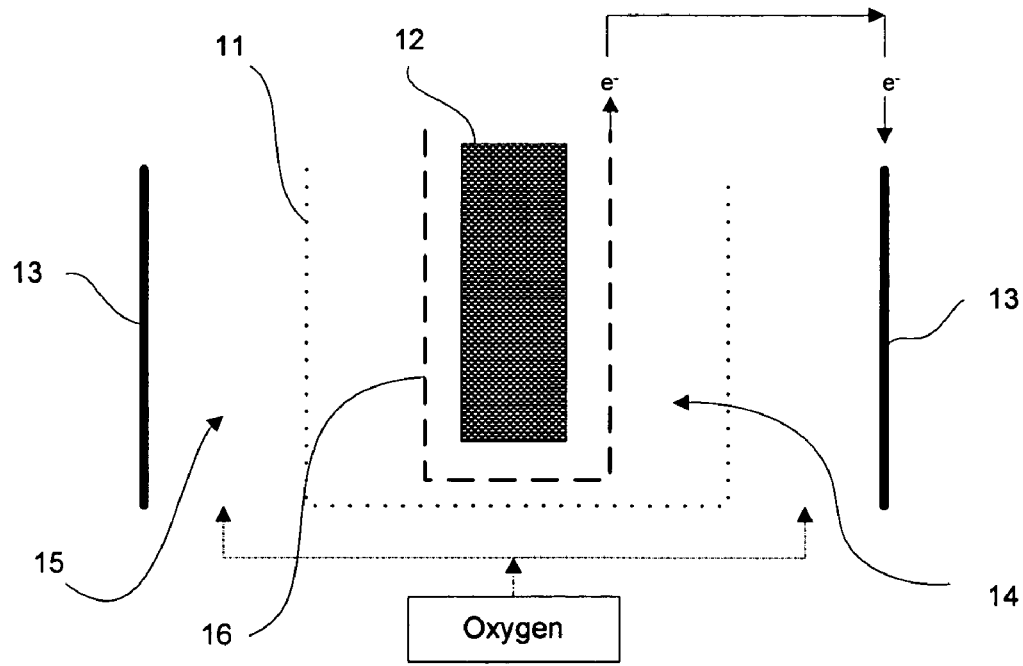
FIG. 2 shows a second embodiment of a direct carbon-air fuel cell based on a molten metal hydroxide electrolyte.

In another embodiment as shown in FIG. 2, the carbon anode 12 is placed in a porous perforated metal basket 16, which is then submersed into an electrolyte. The separator 11 is placed between the perforated metal basket 16 and the cathode 13 to separate the anolyte and the catholyte into two compartments 14 and 15, respectively. The metal basket 16 serves as an anode current collector and the carbon anode 12 contained in the metal basket 16 can be in the form of chunks and other small carbon particles so that the anode compartment 14 is comprised of a slurry containing a mixture of carbon fuel particles and electrolyte (anolyte) and an anode current collector 16. Thus, the use of a preformed single-piece carbon anode can be avoided.

The cathode compartment 15 is comprised of an oxygen cathode 13, electrolyte (catholyte) and an oxygen-containing gas and is of the same structure and properties as the cathode 13 in the first embodiment.

A porous metal structure can serve as anode current collector 16. The anode current collector 16 can comprise a mesh, grid, felt, screen, sintered frit or other similar electronically-conductive matrix that allows effective contact with and transport of the carbon fuel and electrolyte. In addition, the anode current collector 16 comprises any metal that cannot melt at the operating temperature of the cell and is stable against corrosion in the molten carbonate and hydroxide mixed electrolyte. Nickel and nickel based alloys can be preferentially employed as anode the current collector 16.

Figure 3:
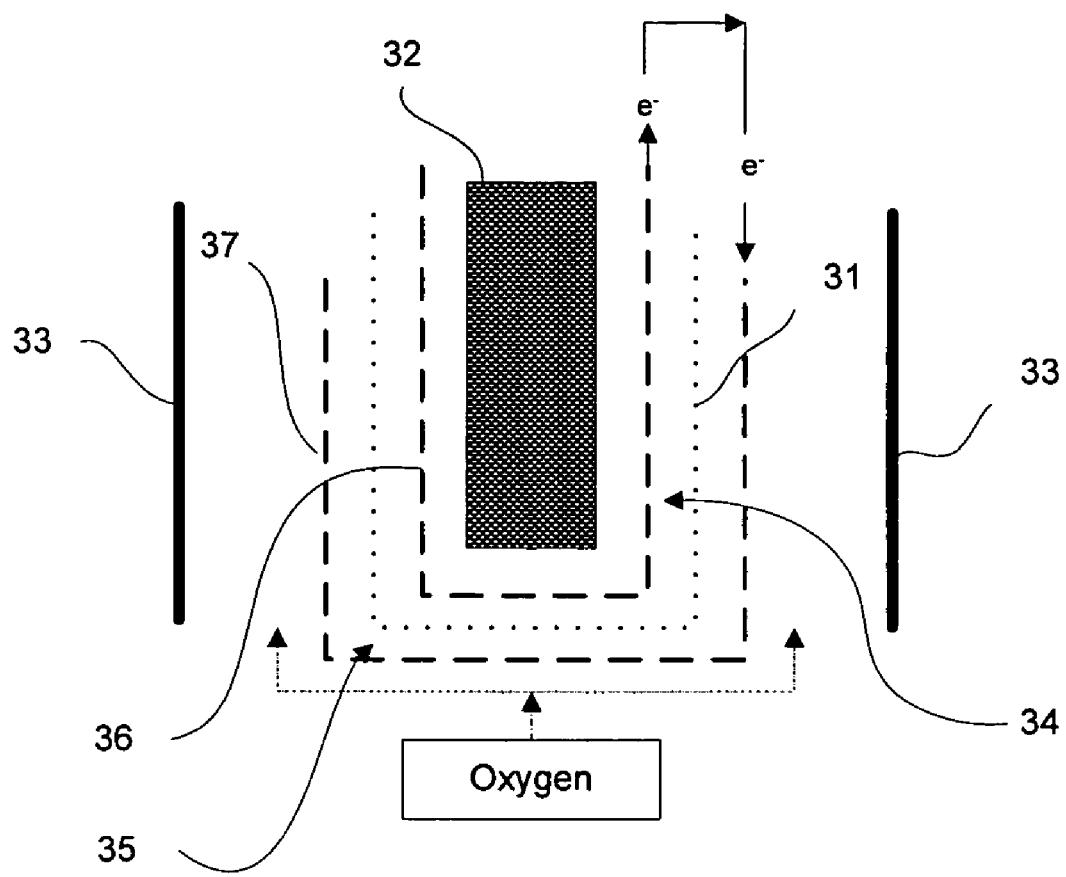
FIG. 3 shows a third embodiment of a direct carbon-air fuel cell based on a molten metal hydroxide electrolyte.

In a third embodiment as shown in FIG. 3, a separator 31 is placed around a carbon anode 32 in a cell container 33 to divide the cell into two compartments 34 and 35. In this embodiment, porous electric conductors 36 and 37 such as metal coatings, perforated or expanded metal sheets or like material are placed over both sides of the porous separator 31 in the compartments 34 and 35, respectively. The porous electric conductor 36 is a basket that can accommodate chunks and other particulate type of carbon material. The electric conductor 37 placed in the compartment 35 serves as the cathode electrode. Similar to the embodiments as shown in FIGS. 1 and 2, ion transport based on diffusions and convection between the anolyte contained in the compartment 34 and the catholyte contained in the compartment 35 is hindered by the fine pores of the separator 31. The transport of carbonate ions from the anolyte to catholyte is thus prevented. As a result, the composition of the catholyte remains unchanged, while reaction of the carbonate ions with the carbon anode 32 releases gaseous carbon dioxide.

In this embodiment the cell housing 33 and the cathode 37 are separate parts of the cell. The advantage of this cathode design is lower voltage losses across the catholyte.

The above description is given by way of example, and not limitation. Given the above disclosure, one skilled in the art could devise variations that are within the scope and spirit of the invention disclosed herein, including various ways of preventing the carbonate ions from transporting towards the catholyte. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A direct carbon-air fuel cell having two different electrolytes, comprising a cathode compartment having a molten metal hydroxide catholyte and an anode compartment having a molten carbonate anolyte, a gas inlet to introduce an oxygen-containing gas into the cathode compartment containing a molten metal hydroxide catholyte, and a separator disposed between said anode and cathode compartments and having a plurality of pores small enough to hinder ion transport based on diffusion and convection, while allowing ion transport based migration under the influence of an electric field, wherein the separator is fabricated from metal.

2. The direct carbon-air fuel cell of claim 1, wherein the separator divides the cell into an anolyte compartment containing an anolyte around the carbon anode and a catholyte compartment containing a catholyte near the oxygen cathode.

3. The direct carbon-air fuel cell of claim 1, wherein the oxygen-containing gas is reduced at the cathode to produce hydroxyl ions, and carbon is oxidized at the anode to produce $CO_2$.

4. The direct carbon-air fuel cell of claim 3, wherein the hydroxyl ions are operative to migrate into the anolyte compartment by an electric field to react with the carbon anode to form carbonate ions.

5. The direct carbon-air fuel cell of claim 4, wherein when the amount of carbonate ions reaches a specific level, the carbonate ions start reacting with the carbon anode to release gaseous carbon dioxide.

6. The direct carbon-air fuel cell of claim 1, further comprising a porous or perforated metal basket submersed in the anolyte compartment for accommodating the anode therein.

7. The direct carbon-air fuel cell of claim 6, wherein the anode includes carbon chunks or particles.

8. A direct carbon-air fuel cell having two different electrolytes, comprising:
a cell container, containing an electrolyte therein;
a first porous electric conductor for accommodating a carbon anode therein;
a second porous electric conductor placed between the first porous electric conductor and the cell container to serve as a cathode electrode;
a porous separator placed between the first and the second porous electric conductors to separate the electrolyte into a molten carbonate-based anolyte in an anolyte compartment around the carbon anode and a molten hydroxide catholyte in a catholyte compartment near the cathode electrode, wherein the porous separator is fabricated from metal and includes a plurality of pores small enough to prevent ion transport between the anolyte and catholyte based by diffusion and convection, while allowing ion transport caused by an electric field; and
a gas inlet to introduce a gas containing oxygen into the catholyte compartment containing the molten hydroxide catholyte.

9. The direct carbon-air fuel cell of claim 8, wherein the first and second electric conductors are fabricated from metal coating, perforated, expanded metal sheet, mesh, grid, felt, screen, or sintered frit.

10. The direct carbon-air fuel cell of claim 8, wherein reduction of the oxygen occurs at the cathode electrode according to:

$$O_2 + 2H_2O + 4e^- \rightarrow 4OH^-.$$

11. The direct carbon-air fuel cell of claim 10, wherein an electric field between the first and second electric conductors migrate the hydroxyl ions from the molten hydroxide catholyte compartment to the molten carbonate-based anolyte compartment and leave the catholyte unchanged.

12. The direct carbon-air fuel cell of claim 11, wherein the hydroxyl ions react at the carbon anode according to:

$$C + 6OH^- \rightarrow CO_3^{2-} + 3H_2O + 4e^-.$$

13. The direct carbon-air fuel cell of claim 12, wherein the amount of carbonate ions increase to cause a reaction to release gaseous carbon dioxide according to:

$$C + 2CO_3^{2-} \rightarrow 3CO_2 + 4e^-.$$

* * * * *